(12) United States Patent
Antillon

(10) Patent No.: US 11,896,148 B2
(45) Date of Patent: Feb. 13, 2024

(54) MAGNETIC SHELVING FENCE

(71) Applicant: Walmart Apollo, LLC, Bentonville, AR (US)

(72) Inventor: Gabriel Antillon, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 129 days.

(21) Appl. No.: 17/309,814

(22) PCT Filed: Dec. 20, 2019

(86) PCT No.: PCT/US2019/067952
§ 371 (c)(1),
(2) Date: Jun. 21, 2021

(87) PCT Pub. No.: WO2020/132503
PCT Pub. Date: Jun. 25, 2020

(65) Prior Publication Data
US 2022/0061554 A1 Mar. 3, 2022

Related U.S. Application Data

(60) Provisional application No. 62/783,637, filed on Dec. 21, 2018.

(51) Int. Cl.
*A47F 5/00* (2006.01)
*F16B 1/00* (2006.01)

(52) U.S. Cl.
CPC .............. *A47F 5/0068* (2013.01); *F16B 1/00* (2013.01); *F16B 2200/83* (2023.08)

(58) Field of Classification Search
CPC ...... A47F 5/0068; A47F 5/0043; A47F 13/00; A47F 5/108; F16B 1/00; F16B 2001/0035; F16B 2200/83
See application file for complete search history.

(56) References Cited

U.S. PATENT DOCUMENTS 1,704,562 A * 3/1929 Egan .......................... G09F 3/20
40/658
2,320,463 A * 6/1943 Pavlovic, Jr. ............. G09F 3/20
40/653
(Continued)

OTHER PUBLICATIONS

International Search Report and Written Opinion, International Application No. PCT/US2019/067952, dated Feb. 27, 2020, 12 pages.

*Primary Examiner* — Ko H Chan
(74) *Attorney, Agent, or Firm* — Foley IP Law, PLLC

(57) ABSTRACT

A magnetic shelving fence that provides stabilization of retail products on merchandised shelving during shelving relocation. The includes an elongate multi-surfaced structure and one or more magnets. The elongate structure includes a vertical front plate, a horizontal mount plate, and an edge surround portion. The vertical front plate provides a planar barrier to merchandized product movement. The horizontal mount plate is disposed in a generally perpendicular orientation with respect to the vertical front plate. The edge surround portion connects the lower edge of the front plate to the horizontal mount plate and defines a channel shaped to surround a front edge of shelving. The magnets of the magnetic shelving fence are fixedly coupled to the horizontal mount plate. Further, the magnets are oriented to secure the elongate multi-surfaced structure with a bottom face of metal shelving via temporary and non-destructive attachment.

18 Claims, 10 Drawing Sheets

(56) References Cited

U.S. PATENT DOCUMENTS

| | | | | |
|---|---|---|---|---|
| 3,086,308 A | * | 4/1963 | Ternouth | G09F 3/20 362/812 |
| 4,866,868 A | * | 9/1989 | Kass | G09F 3/204 40/661 |
| 5,220,739 A | * | 6/1993 | Chich | G09F 13/04 40/550 |
| 5,357,943 A | * | 10/1994 | Edgerton | F24C 15/12 126/211 |
| 5,509,634 A | * | 4/1996 | Gebka | G09F 3/204 24/336 |
| 5,546,928 A | * | 8/1996 | Lewis | F24C 15/36 126/211 |
| 6,155,438 A | * | 12/2000 | Close | A47F 1/125 211/DIG. 1 |
| 6,299,004 B1 | | 10/2001 | Thalenfeld et al. | |
| 7,578,088 B2 | * | 8/2009 | Alves | G09F 3/204 248/220.21 |
| 8,573,134 B2 | * | 11/2013 | Brenner | A47B 95/043 126/42 |
| 8,608,218 B1 | * | 12/2013 | Marthens | A47F 13/08 211/59.3 |
| 9,697,753 B2 | * | 7/2017 | Johnson | G09F 3/204 |
| 10,113,715 B2 | * | 10/2018 | Xue | F21V 5/04 |
| 10,702,078 B1 | * | 7/2020 | Walker | A47F 5/0025 |
| 2006/0117627 A1 | * | 6/2006 | Fast | G09F 3/204 40/642.01 |
| 2008/0061015 A1 | | 3/2008 | Hardy et al. | |
| 2009/0321595 A1 | * | 12/2009 | Conway | G09F 3/204 248/205.3 |
| 2011/0174750 A1 | | 7/2011 | Poulokefalos | |
| 2014/0034590 A1 | | 2/2014 | Szpak et al. | |

\* cited by examiner

MAGNETIC SHELVING FENCE

RELATED APPLICATIONS

The present application is a National Phase entry of PCT Application No. PCT/US2019/67952, filed Dec. 20, 2019, which claims priority from U.S. Provisional Application No. 62/783,637, filed Dec. 21, 2018, each of which is hereby fully incorporated herein by reference.

TECHNICAL FIELD

This disclosure relates to a barrier attachment to merchandised retail shelving, and more particularly to a non-destructive, temporary, magnetically-attached fence that stabilizes and reduces movement of retail products on modular shelving during movement and transport of the shelving during relocation within a store.

BACKGROUND

In many stores and retail locations, shelving, or sections of shelving sometimes referred to as "modulars", are present throughout the store and are stocked with merchandise. This merchandize can be displayed in a well designed and precise layout and configuration, for example. At certain times, these entire shelving units or sections of shelving must be moved and relocated within the store for remodeling, cleaning, or modifications to store layout and configuration. This can be done with the aid of dollies or other moving equipment. When these relocations happen, shelving often needs to be fully unloaded from the shelving and then fully restocked and configured once the shelving reaches its desired destination. This is done to prevent damage to falling products as well as individuals that might be hurt by such falling products. This unloading and restocking can be a time-consuming and difficult task.

Accordingly, there is a desire for an improved apparatus or solution permitting merchandised shelving transport which would minimize unloading and loading of merchandised products and which overcomes past difficulties incurred during such shelving movement.

SUMMARY

Embodiments described or otherwise contemplated herein substantially provide the advantages of a readily and non-destructively attachable barrier to prevent products from falling off merchandized sections of shelving and/or modulars during shelving relocation or movement within a store.

One embodiment relates to a magnetic shelving fence that provides stabilization of retail products on merchandised shelving during shelving relocation. The magnetic shelving fence includes an elongate multi-surfaced structure and one or more magnets. The elongate multi-surfaced structure includes a vertical front plate, a horizontal mount plate, and an edge surround portion. The vertical front plate generally extends between a top edge and a lower edge and provides a planar barrier to merchandized product movement. The horizontal mount plate is disposed in a generally perpendicular orientation with respect to the vertical front plate. The edge surround portion connects the lower edge of the vertical front plate to the horizontal mount plate and defines a channel shaped to surround a front edge of shelving. The one or more magnets of the magnetic shelving fence are fixedly coupled to the horizontal mount plate. Further, the magnets are oriented to secure the elongate multi-surfaced structure with a bottom face of metal shelving via temporary and non-destructive attachment.

One embodiment relates to a magnetic shelving fence system that provides stabilization of retail products on merchandised shelving during shelving relocation. The magnetic shelving fence system includes an elongate multi-surfaced structure, a pair of magnets, a pair of mounting tabs, and a pair of mounting handles. The elongate multi-surfaced structure includes a vertical front plate, a horizontal mount plate, and an edge surround portion. The vertical front plate generally extends between a top edge and a lower edge and provides a planar barrier to product movement. The horizontal mount plate is disposed in a generally perpendicular orientation with respect to the vertical front plate. The edge surround portion connects the lower edge of the vertical front plate to the horizontal mount plate and defines a channel shaped to surround a front edge of shelving. The pair of magnets of the system are fixedly coupled to the horizontal mount plate and oriented to secure the elongate multi-surfaced structure with a bottom face of metal shelving via temporary and non-destructive attachment. The pair of mounting tabs are each secured to the horizontal mount plate and include a downwardly angled portion. The pair of mounting handles each include a receiving slot at its distal end and that is sized to slide over and engage the downwardly angled portion of one of the mounting tabs.

The above summary is not intended to describe each illustrated embodiment or every implementation of the subject matter hereof. The figures and the detailed description that follow more particularly exemplify various embodiments.

BRIEF DESCRIPTION OF THE FIGURES

Subject matter hereof may be more completely understood in consideration of the following detailed description of various embodiments in connection with the accompanying figures.

Figure 1:
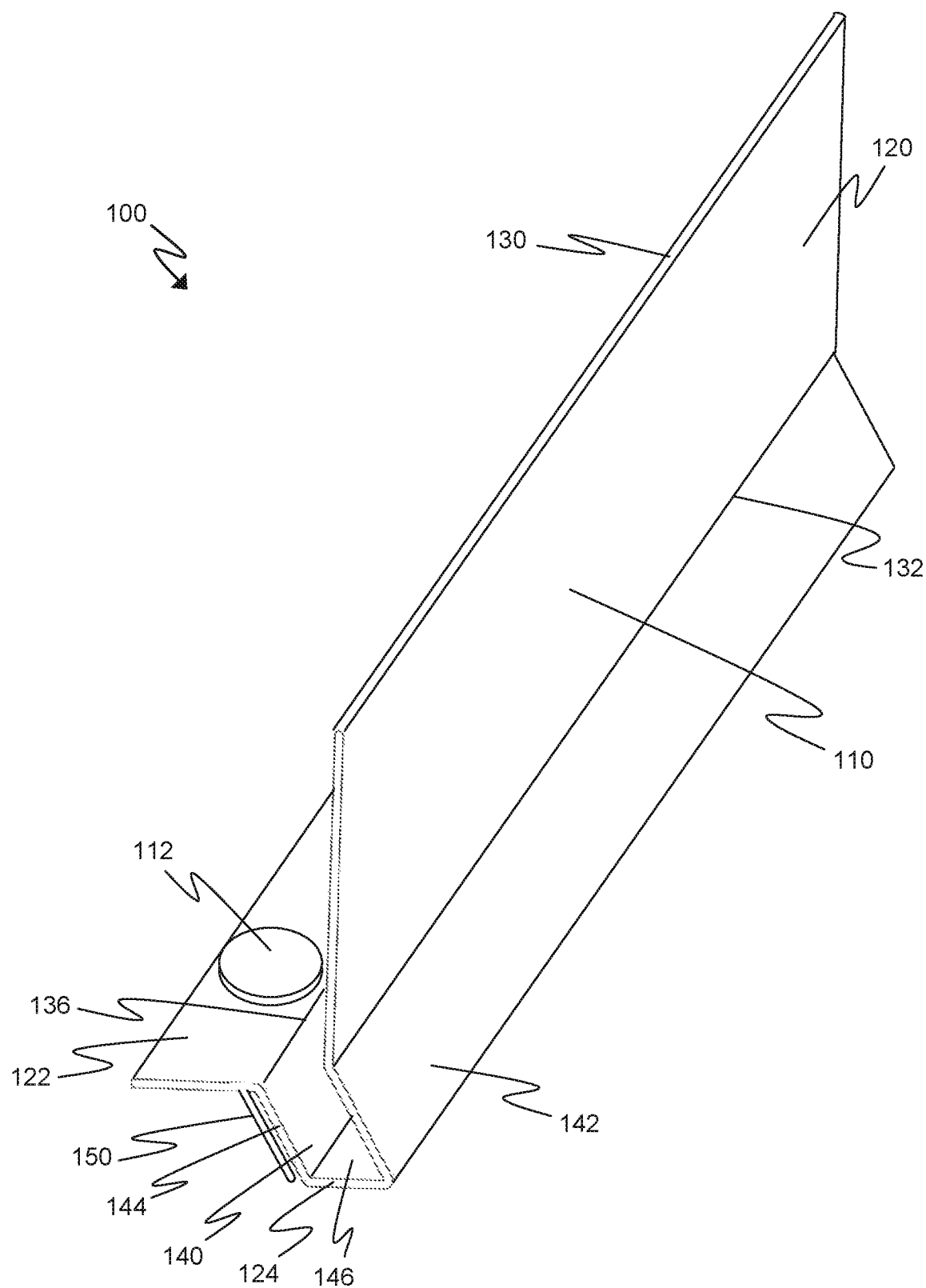
FIG. 1 is a perspective view of a magnetic shelving fence, according to an embodiment.
Figure 2:
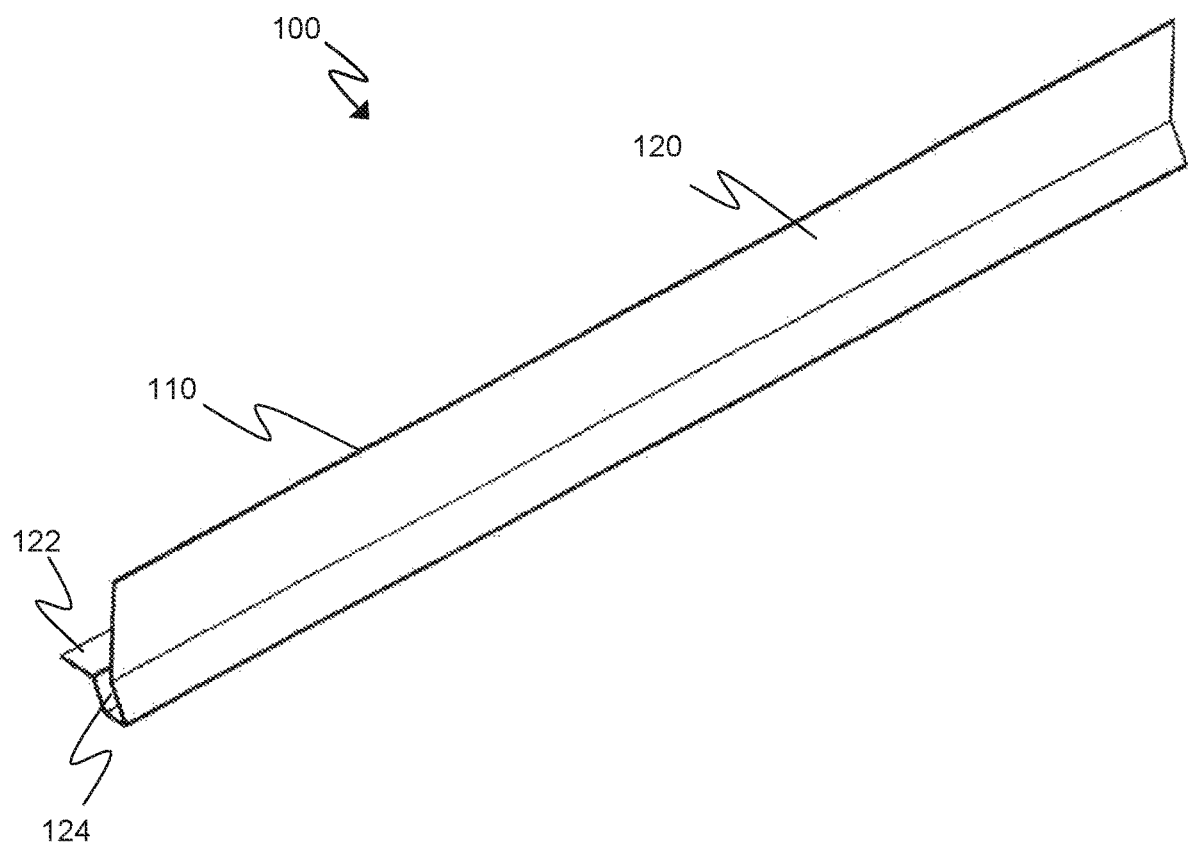
FIG. 2 is a perspective view of a magnetic shelving fence, according to an embodiment.
Figure 3:
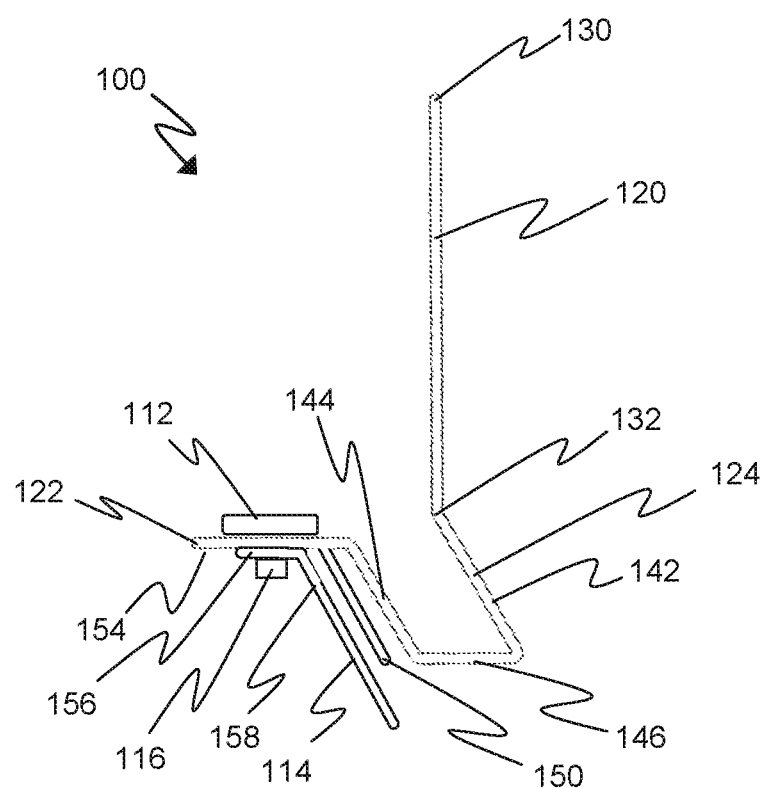
FIG. 3 is a side view of a magnetic shelving fence, according to an embodiment.

While various embodiments are amenable to various modifications and alternative forms, specifics thereof have been shown by way of example in the drawings and will be described in detail. It should be understood, however, that the intention is not to limit the claimed subject matter to particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments generally relate to a non-permanent, couplable barrier for location on the outer, outwardly-projecting, edge of retail shelving. The barrier acts as a fence and prevents products from falling off the shelves which could result in damaged products or injuries to persons in the proximity. In general, this type of barrier is not attached to the shelves during retail use, as it obstructs access to items, but rather is used for temporary attachment when a shelving unit, loaded with merchandise is moved and relocated within a store or warehouse.

Figure 4:
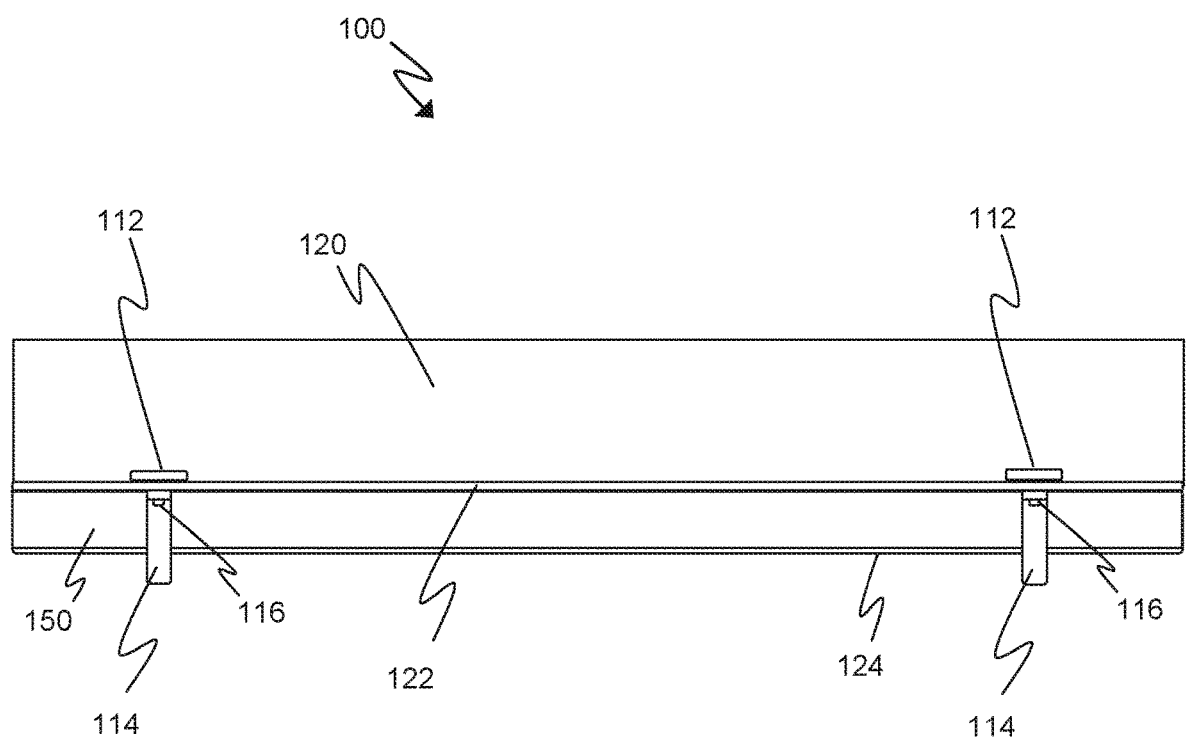
FIG. 4 is a rear view of a magnetic shelving fence, according to an embodiment.
Figure 5:
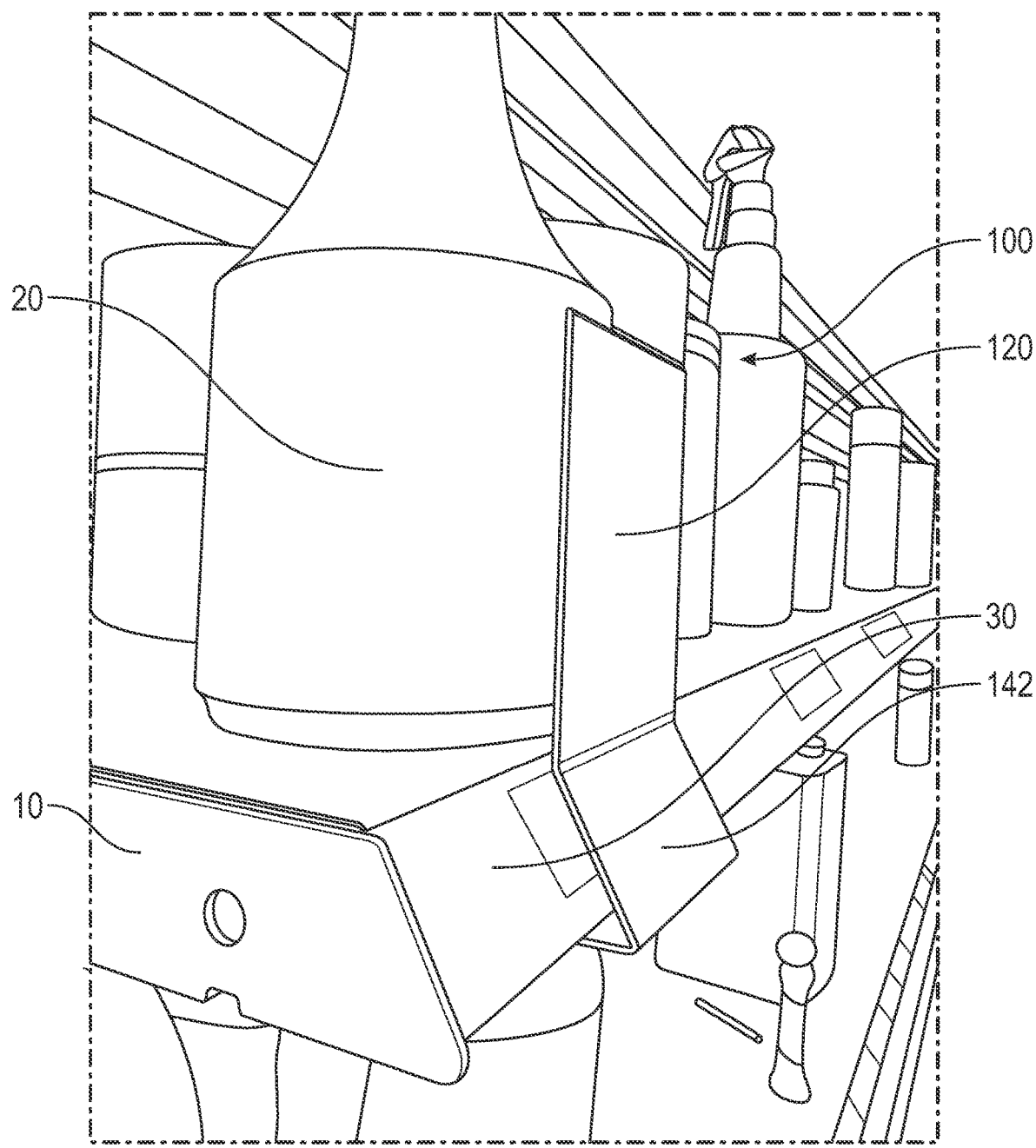
FIG. 5 shows a magnetic shelving fence attached to shelving, according to an embodiment.

FIGS. 1-10 each show the magnetic shelving fence 100 in various configurations. In general: FIGS. 1-4 can be understood to show the magnetic shelving fence 100 by itself; FIGS. 4 and 5 show a device considered to be either a sample section of magnetic shelving fence 100 or a magnetic shelving fence 100 of very narrow width for illustrative purposes; and FIGS. 6-10 show an example of a magnetic shelving fence system 300 in which a small segment of the magnetic shelving fence 100 is coupled to a mounting handle 200 in various sequential stages of manipulating the magnetic shelving fence 100 for shelf attachment.

Referring first to FIGS. 1-4, the magnetic shelving fence 100 can include an elongate multi-surfaced structure 110, magnets 112, mounting tabs 114, and fasteners 116. Elongate multi-surfaced structure 110 includes a continuous group of panel surfaces forming a common shape.

The side-to-side width of the magnetic shelving fence 100 can vary. In some embodiments, the width of the fence is just under four feet wide such that it fits well on a typical four foot wide modular shelf. In some embodiments, the fence is four feet wide or less. In some embodiments, the width can be vary narrow, as depicted in the sections shown in FIGS. 5-10. The thickness of the elongate multi-surfaced structure 110 is fairly thin and panel-like. In some embodiments, the elongate multi-surfaced structure 110 is made of metal. In some embodiments, the elongate multi-surfaced structure 110 is made of plastic. In some embodiments, the elongate multi-surfaced structure 110 is formed of an extruded material.

Elongate multi-surfaced structure 110 can be understood as including a vertical front plate 120, a horizontal mount plate 122, and an edge surround portion 124. The vertical front plate 120 generally extends between a top edge 130 and a lower edge 132. This provides a planar barrier to merchandized product movement. In some embodiments, the vertical front plate 120 is between four and eight inches tall. In some embodiments, the vertical front plate 120 is at least six inches tall. Other taller or shorter dimensions are contemplated and depend upon the shelving arrangement and size of products that are being restrained by the fence.

The horizontal mount plate 122 is disposed in a generally perpendicular orientation with respect to the vertical front plate 120. In various embodiments, the angled orientation of these plates may vary a small number of degrees from perpendicular, but are still deemed generally perpendicular to one another for purposes of this disclosure. In some embodiments, other angles between the vertical front plate 120 and horizontal mount plate 122 are possible. The horizontal mount plate 122 is generally oriented such that it can be aligned in parallel relation with the bottom surface 40 of shelving 10 to which it couples.

Edge surround portion 124 connects the lower edge 132 of the vertical front plate 120 to horizontal mount plate 122. Specifically, this connection to the horizontal mount plate 122 can generally be with its edge 136. Edge surround portion 124 defines a channel 140 shaped to surround a front edge of shelving. The edge surround portion 124 has a front section 142, a bottom section 146, and a back section 144. The front section 142 and back section 144 each angle forwardly in spaced apart parallel disposition. In general, the channel 140 of the edge surround portion 124 is sized to surround and accommodate a variety of counter edge types. In some embodiments, the shape of edge surround portion 124 and channel 140 may be somewhat irregular and can have sides that are not parallel or planar, for example.

In some embodiments, like the ones shown in the figures, a support panel 150 extends in a parallel manner adjacent the back section 144 to provide structural support to the edge surround portion 124. This support panel 150 can extend the entire length of the back section 144 of the edge surround portion 124. In some embodiments, only short sections of support panel 150 reinforce the edge surround portion 124.

In general, the magnetic shelving fence 100 includes one or more magnets 112 fixedly coupled to the horizontal mount plate 122. The magnets 112 are oriented to secure the elongate multi-surfaced structure 110 with a bottom face of metal shelving via temporary and non-destructive attachment. Although only one magnet can be seen in FIG. 1, in various embodiments, magnets 112 can be located near the ends of the horizontal mount plate 122 (see FIG. 4, for example) or in spaced apart relation along the entire length of the horizontal mount plate 122. In some embodiments, only a single magnet 112 will be used on the horizontal mount plate 122, in other embodiments, a plurality of magnets 112 are possible. Magnets 112 of various sizes, shapes, and strength are contemplated by this disclosure.

The magnetic shelving fence 100 can also include a mounting tab 114 secured to a bottom surface 154 of the horizontal mount plate 122. In some embodiments, the mounting tab 114 can include a flat attachment portion 156 with a central aperture and a downwardly angled portion 158. See FIG. 3. Mounting tab 114 is a short bar segment providing an outwardly projecting rigid structure with which a mounting handle 200 can engage. In some embodiments, a fastener 116 (such as a bolt or similar hardware) can pass through an aperture in the mounting tab 114 and the horizontal mount plate 122 and into a magnet 112 disposed on the top of the horizontal mount plate 122. This fastener arrangement provides a rigid assembly for the magnetic shelving fence 100. In some embodiments, other methods of coupling, fastening, fixing, adhering or otherwise attaching these components together is contemplated.

As seen in the rear view depiction of the magnetic shelving fence 100 in FIG. 4, the spaced apart arrangement of mounting features can be understood. Namely, magnets 112 and corresponding mounting tabs 114 are located near the ends of the fence 100. In a configuration in which the fence 100 is just under four feet wide, the magnets 112 are located in convenient locations to manipulate with the two arms and hands of an operator. In various locations, particularly on lower shelves, magnetic shelving fences 100 will not require mounting handles 200 (as discussed later) or other special tools to couple with a shelf and operators can easily manipulate the fence into position by hand.

FIG. 5 show a magnetic shelving fence 100 coupled with shelving 10. The magnetic shelving fence 100 shown in this FIG. as well as the other remaining FIGS. 6-10 is shorter than the version of the fence 100 shown in FIGS. 1-4. This shortened section is useful for explanation and visualization of the various features, but should not be viewed as limiting to the size and width of the magnetic shelving fence 100. For example, a version slightly under four feet wide may be a common width in view of common modular sections that are four feet wide each. Although only one magnet 112 and corresponding mounting tab 114 and fastener 116 is shown, embodiments should be understood to include any number of such features spaced along the horizontal mount plate 122 depending upon its width and configuration. In FIG. 5, the manner in which the magnetic shelving fence 100 serves as a barrier to merchandised products 20 and surrounds the outer edge 30 of the shelf 10 can be understood. Specifically, the outer edge 30 is located within the channel 140 formed in the edge surround portion 124. None of the front section 142, bottom section 146 or back section 144 actually contact the outer edge 30 of the shelf 10. The angled front section 142 extends forward of the location of the vertical front plate 120 at the bottom to capture the outer edge 30. Accordingly, this arrangement places the vertical front plate 120 in close proximity to products 20 which aids in their stabilization and retention when shelf movement occurs.

Figure 6:
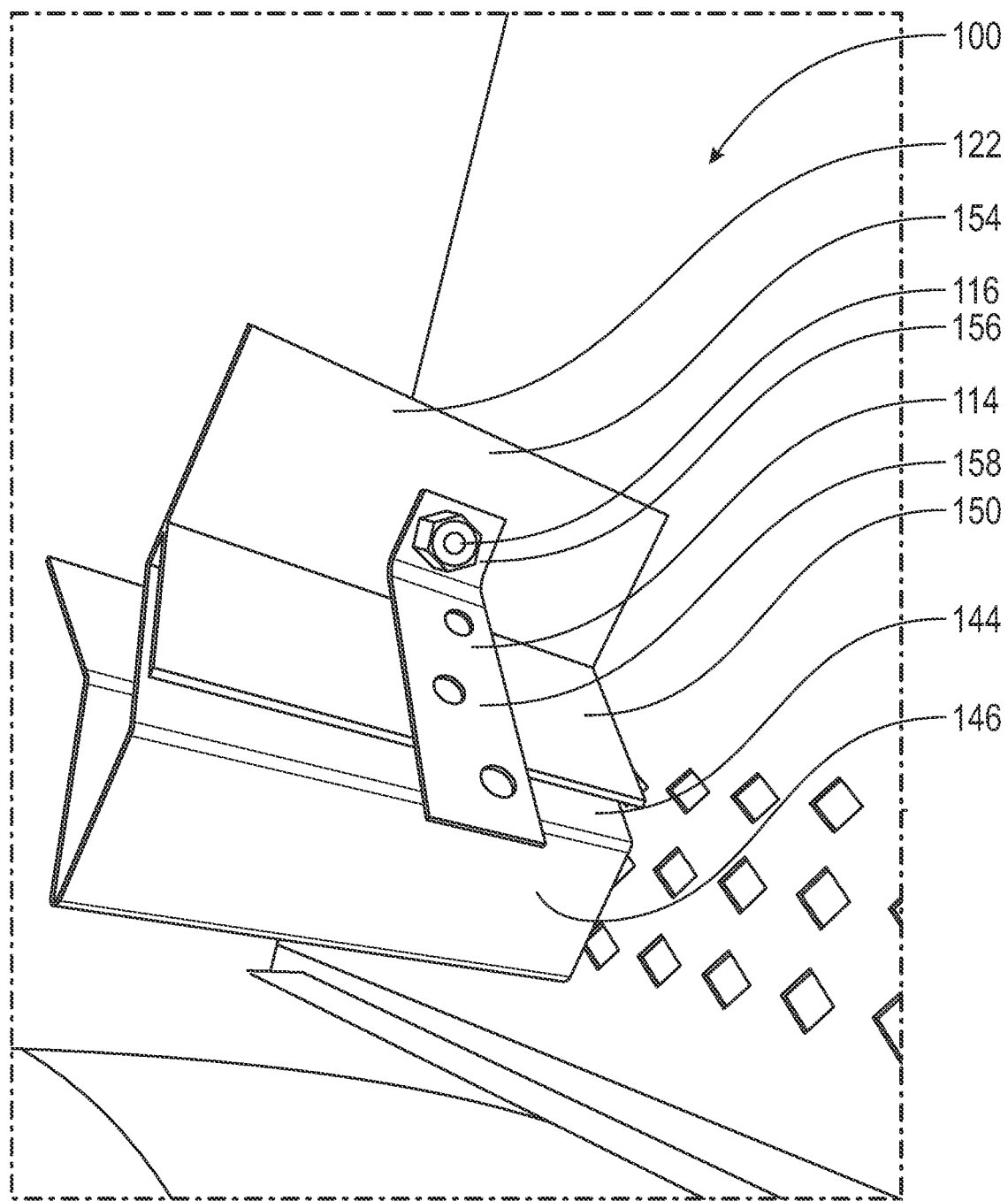
FIG. 6 shows rear and lower components of a magnetic shelving fence, according to an embodiment.
Figure 7:
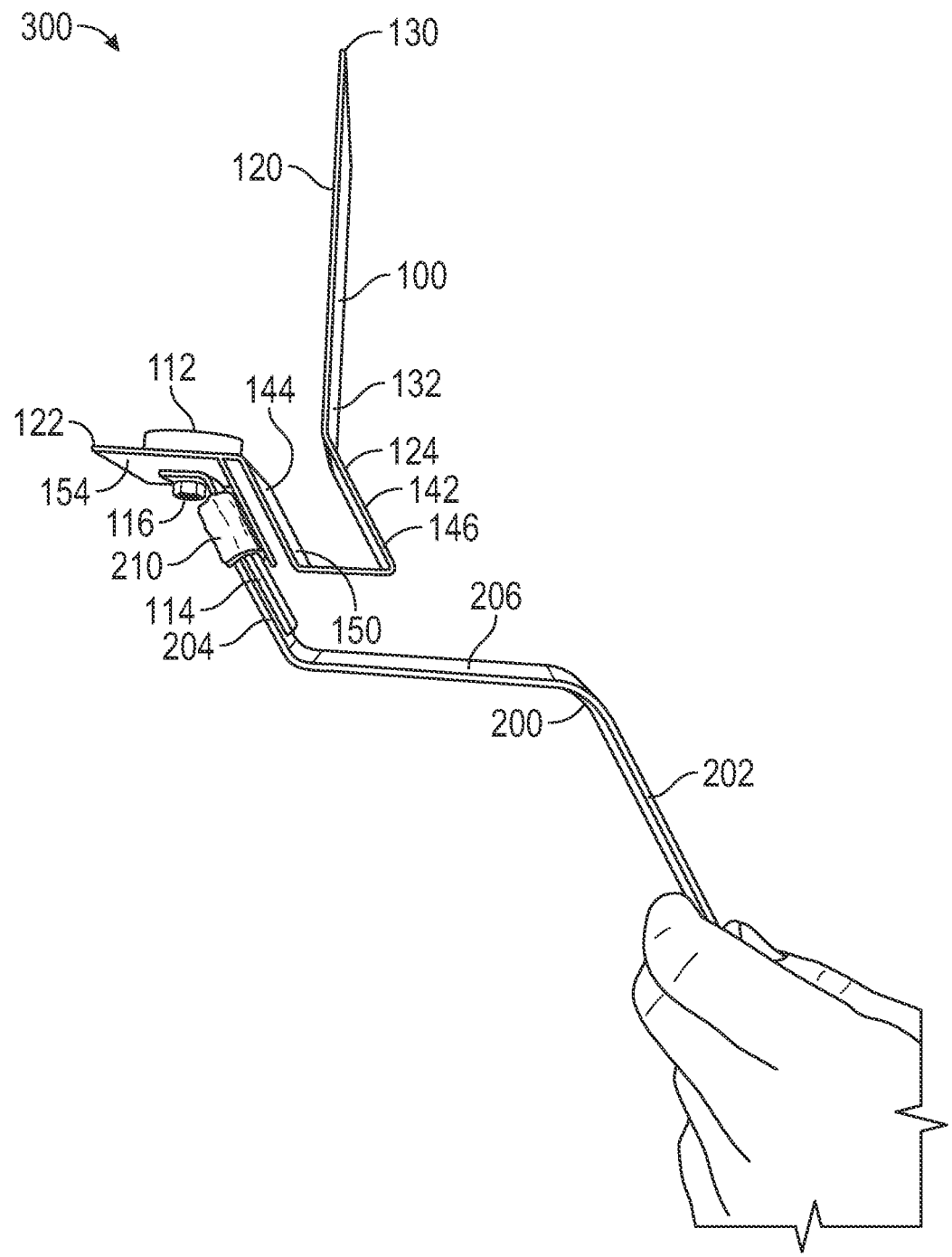
FIG. 7 is a side view of a magnetic shelving fence system where a section of magnetic shelving fence is being supported by a coupled mounting handle, according to an embodiment.

FIG. 6 shows rear and lower components of a magnetic shelving fence 100. Specifically, the fastener 116 and mounting tab 114 are shown coupled to the bottom surface 154 of the horizontal mount plate 122. Both the flat attachment portion 156 and downwardly angled portion 158 of the mounting tab 114 are shown. The flat attachment portion 156 generally abutting the bottom surface 154 and the downwardly angled portion 158 extending below the rest of the magnetic shelving fence 100 for ease of attachment by a mounting handle 200. Support panel 150 is shown in parallel orientation to back section 144. Note that in various embodiments an additional support panel 150 may not be necessary.

In FIGS. 7-10, the magnetic shelving fence 100 is shown being positionable with a mounting handle 200. In general, combinations of magnetic shelving fence 100 and one or more mounting handles 200 will be referenced as a magnetic shelving fence system 300. Including releaseably coupleable mounting handles 200 allows users to reach higher shelves 10 and better manipulate the magnetic shelving fence 100 generally.

In these arrangements, the mounting handle 200 has a receiver 210 defining a slot at the distal end of the mounting handle 200. Specifically, the receiver 210 has a slot that is sized to slide over and engage the mounting tab 114. Mounting handle 200 contains angled and generally parallel proximal and distal ends 202 and 204, multiple bends and a straight central portion 206 to offset the ends 202 and 204. This arrangement permits operator movement further from the shelving to reduce interference with adjacent shelving. Systems 300 shown in FIGS. 7-10 depict only short segments of magnetic shelving fence 100 and only a single mounting handle 200. However, systems 300 should be understood to readily include any number of magnets 112 and mounting tabs 114 in which a corresponding number of mounting handles 200 engage. In one contemplated embodiment, as understood from FIG. 4, two locations of magnets 112 and corresponding mounting tabs 114 are present in the magnetic shelving fence 100 at spaced-apart locations. In such an embodiment, a single operator can use both hands, where each hand can holds a mounting handle 200 and manipulates the magnetic shelving fence 100.

Magnetic shelving fence systems 300 can be understood to have any number of magnets 112, mounting tabs 114, and handles 200. In one embodiment, a system 300 could include a pair of magnets 114 fixedly coupled to the horizontal mount plate 122. The magnets 114 being oriented to secure the elongate multi-surfaced structure 110 with a bottom surface 40 of metal shelving 10 via temporary and non-destructive attachment. The embodiment could further include a pair of mounting tabs 114 each secured to the horizontal mount plate 122 and include a downwardly angled portion 158. The embodiment could also include a pair of mounting handles 200 that each include a receiver 210 with a receiving slot at its distal end that is sized to slide over and engage the downwardly angled portion 158 of one of the mounting tabs 114.

Figure 8:
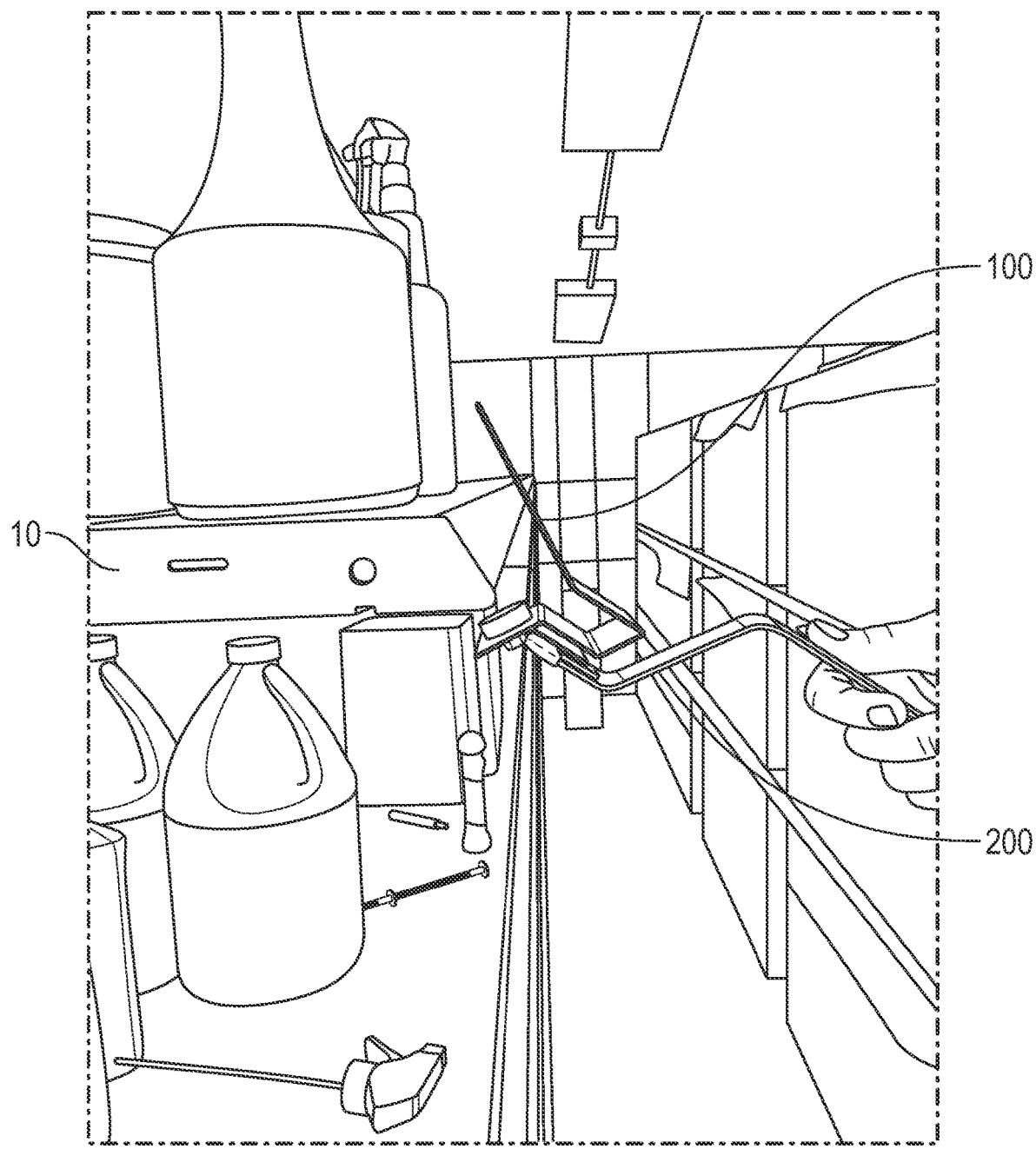
FIG. 8 is a side view of a magnetic shelving fence being supported by a coupled mounting handle and angled to surround the edge of the shelving, according to an embodiment.

In FIG. 8, a side view is shown of a magnetic shelving fence 100 being supported by a coupled mounting handle 200 and is angled to surround the edge 30 of the shelving 10. As shown, the magnet 112 and associated structures are brought toward the underside of the shelf 10 using an inward and upward motion.

Figure 9:
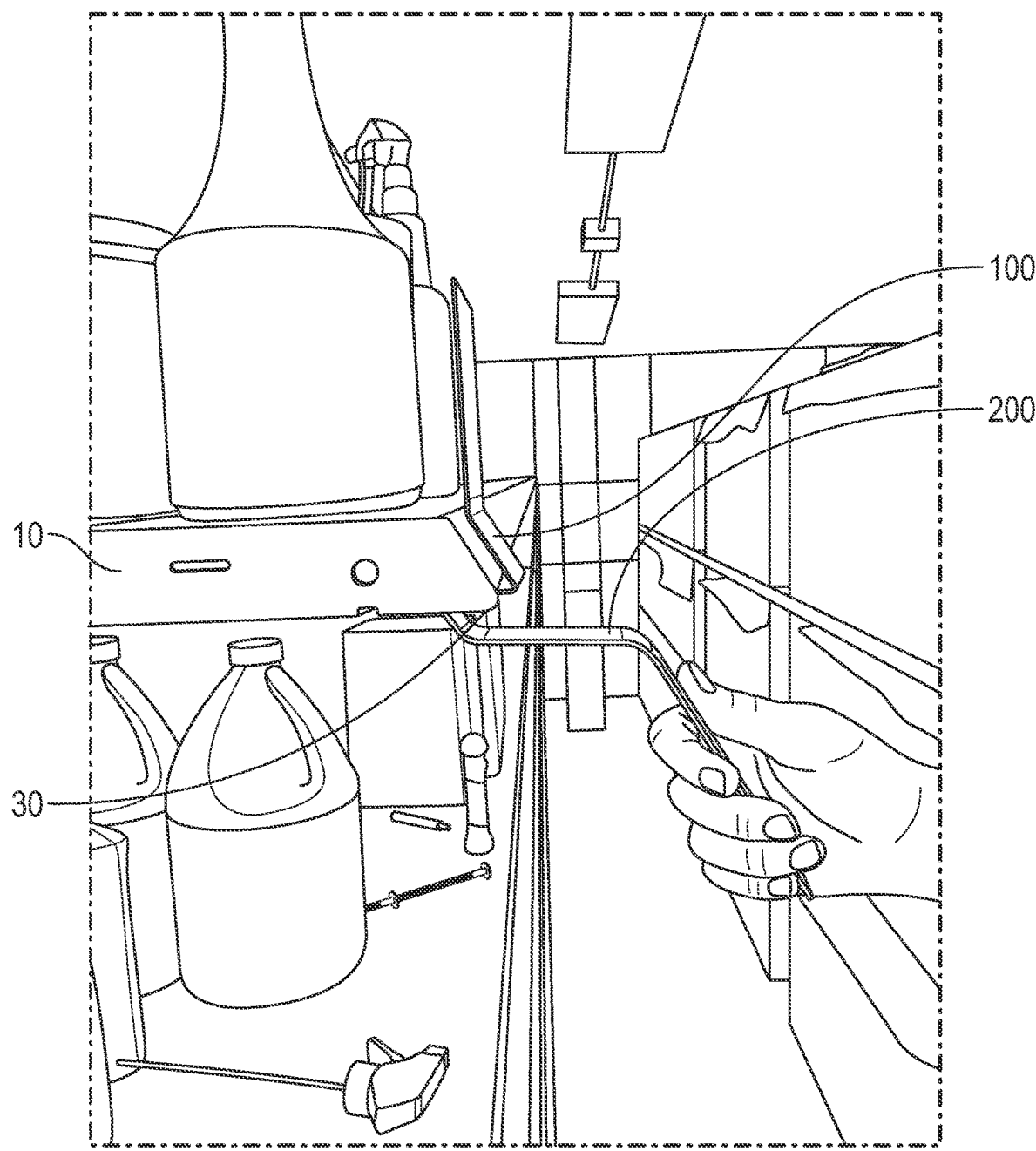
FIG. 9 is side view of a magnetic shelving fence supported by a coupled mounting handle, secured to the bottom of the shelving, and surrounding the edge of the shelving, according to an embodiment.
Figure 10:
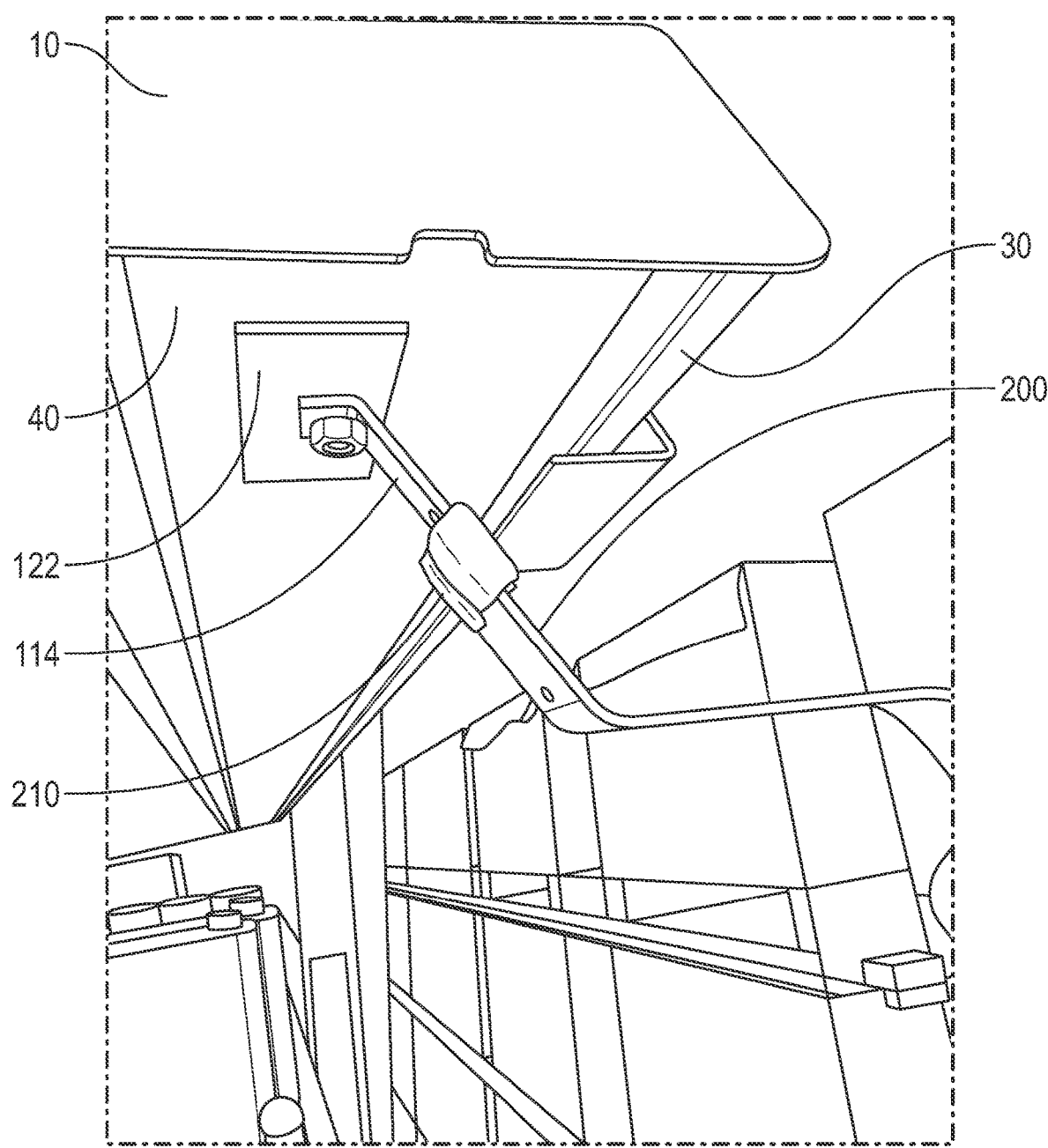
FIG. 10 shows a magnetic shelving fence coupled to the bottom surface of shelving, according to an embodiment.

In FIG. 9, a side view of a magnetic shelving fence 100 is shown supported by a coupled mounting handle 200, secured to the bottom 40 of the shelving 10, and surrounding the edge 30 of the shelving 10. Likewise, FIG. 10 shows a similar configuration from a closer perspective, where magnetic shelving fence 100 is shown coupled to the bottom surface 40 of shelving 10 such that the fence 100 is fixed in place. The horizontal mount plate 122 is generally positioned parallel to the bottom surface 40. At this point, the handle 200 can be slid downward and outward so that the receiver 210 and associated slot disengage from the mounting tab 114.

Various embodiments of systems, devices, and methods have been described herein. These embodiments are given only by way of example and are not intended to limit the scope of the claimed subject matter. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed subject matter.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A magnetic shelving fence that provides stabilization of retail products on merchandised shelving during shelving relocation, comprising:
    an elongate multi-surfaced structure, including:
        a vertical front plate, generally extending between a top edge and a lower edge providing a planar barrier to merchandized product movement;
        a horizontal mount plate disposed in a generally perpendicular orientation with respect to the vertical front plate; and
        an edge surround portion connecting the lower edge of the vertical front plate to the horizontal mount plate, defining a channel shaped to surround a front edge of the merchandised shelving; and
    one or more magnets fixedly coupled to the horizontal mount plate, oriented to secure the elongate multi-surfaced structure with a bottom face of a metal portion of the merchandised shelving via temporary and non-destructive attachment; and
    a mounting tab secured to a bottom of the horizontal mount plate and included a downwardly angled portion, wherein the magnetic shelving fence is positionable with one or more mounting handles having a receiving slot at a distal end that are sized to slide over and engage the mounting tab.

2. The magnetic shelving fence of claim 1, wherein the magnetic shelving fence includes a plurality of magnets.

3. The magnetic shelving fence of claim 1, wherein the metal portion of the merchandised shelving includes a plurality of mounting tabs.

4. The magnetic shelving fence of claim 1, wherein the edge surround portion has a front section, a bottom section and a back section.

5. The magnetic shelving fence of claim 4, wherein the front section and the back section each angle forwardly in spaced apart parallel disposition.

6. The magnetic shelving fence of claim 5, wherein a support panel extends in a parallel manner adjacent the back section to provide structural support to the edge surround portion.

7. The magnetic shelving fence of claim 1, wherein the magnetic shelving fence is four feet wide or less.

8. The magnetic shelving fence of claim 1, wherein the elongate multi-surfaced structure is made of metal.

9. The magnetic shelving fence of claim 1, wherein the elongate multi-surfaced structure is made of plastic.

10. The magnetic shelving fence of claim 1, wherein the elongate multi-surfaced structure is formed of an extruded material.

11. The magnetic shelving fence of claim 1, wherein the vertical front plate is between four and eight inches tall.

12. The magnetic shelving fence of claim 1, wherein the vertical front plate is at least 6 inches tall.

13. The magnetic shelving fence of claim 1, wherein the channel of the edge surround portion is sized to surround and accommodate a variety of counter edge types.

14. A magnetic shelving fence system, that provides stabilization of retail products on merchandised shelving during shelving relocation, comprising:
    an elongate multi-surfaced structure, including:
        a vertical front plate, generally extending between a top edge and a lower edge providing a planar barrier to product movement;
        a horizontal mount plate disposed in a generally perpendicular orientation with respect to the vertical front plate; and
        an edge surround portion connecting the lower edge of the vertical front plate to the horizontal mount plate, defining a channel shaped to surround a front edge of merchandised shelving;
    a pair of magnets fixedly coupled to the horizontal mount plate, oriented to secure the elongate multi-surfaced structure with a bottom face of metal merchandised shelving via temporary and non-destructive attachment;
    a pair of mounting tabs each secured to the horizontal mount plate and include a downwardly angled portion; and
    a pair of mounting handles each including a receiving slot at a distal end that is sized to slide over and engage the downwardly angled portion of one of the mounting tabs.

15. The magnetic shelving fence system of claim 14, wherein the magnetic shelving fence system is four feet wide or less.

16. The magnetic shelving fence system of claim 14, wherein the elongate multi-surfaced structure is made of metal.

17. The magnetic shelving fence system of claim 14, wherein the vertical front plate is between four and eight inches tall.

18. The magnetic shelving fence system of claim 14, wherein the pair of mounting handles each contains multiple bends and a straight central portion to permit operator movement further from the merchandised shelving to reduce interference with adjacent shelving.

* * * * *